US012812414B2

(12) United States Patent
Lee et al.

(10) Patent No.: US 12,812,414 B2
(45) Date of Patent: Nov. 24, 2026

(54) COMMUNICATION APPARATUS AND METHOD FOR CONFIGURING A TRANSMITTER BANDWIDTH AND A RECEIVER BANDWIDTH

(71) Applicant: MEDIATEK INC., Hsin-Chu (TW)

(72) Inventors: Hsin-Ying Lee, Hsinchu City (TW); Ming-Yu Hsieh, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 267 days.

(21) Appl. No.: 18/710,186

(22) PCT Filed: Oct. 24, 2022

(86) PCT No.: PCT/CN2022/126935

§ 371 (c)(1),
(2) Date: May 15, 2024

(87) PCT Pub. No.: WO2023/082976

PCT Pub. Date: May 19, 2023

(65) Prior Publication Data

US 2024/0357381 A1 Oct. 24, 2024

Related U.S. Application Data

(60) Provisional application No. 63/336,386, filed on Apr. 29, 2022, provisional application No. 63/279,206, filed on Nov. 15, 2021.

(51) Int. Cl.

| | |
|---|---|
| ***H04W 24/02*** | (2009.01) |
| ***H04W 72/0457*** | (2023.01) |
| ***H04W 72/51*** | (2023.01) |

(52) U.S. Cl.
CPC ....... *H04W 24/02* (2013.01); *H04W 72/0457* (2023.01); *H04W 72/51* (2023.01)

(58) Field of Classification Search
None
See application file for complete search history.

(56) References Cited

U.S. PATENT DOCUMENTS

| | | | |
|---|---|---|---|
| 11,082,877 | B2 | 8/2021 | Hong |
| 2008/0112358 | A1 | 5/2008 | Bennett |

(Continued)

FOREIGN PATENT DOCUMENTS

| | | | |
|---|---|---|---|
| CN | 106664191 | A | 5/2017 |
| CN | 108882373 | A | 11/2018 |
| CN | 110418372 | A | 11/2019 |

OTHER PUBLICATIONS

Spreadtrum Communications, R1-1808805, "Remaining issues on bandwidth parts and carrier aggregation", 3GPP TSG RAN WG1 Meeting #100-E., Aug. 24, 2018.

(Continued)

*Primary Examiner* — Saad Khawar
(74) *Attorney, Agent, or Firm* — Winston Hsu

(57) ABSTRACT

An embodiment of the invention provides a method for configuring a transmitter (Tx) bandwidth (BW) and a receiver (Rx) BW of a communication apparatus, including: transmitting a first capability of a Tx and a second capability of an Rx to a network device; receiving at least one configuration associated to the first capability and the second capability from the network device; and configuring the Tx BW and the Rx BW according to the at least one configuration; wherein the Tx BW is in a Tx channel BW (CBW), and the Rx BW is in an Rx CBW.

6 Claims, 12 Drawing Sheets

(56) References Cited

U.S. PATENT DOCUMENTS

| | | | | |
|---|---|---|---|---|
| 2011/0075593 | A1 | 3/2011 | Chen | |
| 2019/0007188 | A1* | 1/2019 | Choi | H04L 5/16 |
| 2021/0307010 | A1* | 9/2021 | Abotabl | H04W 72/0453 |
| 2021/0352667 | A1 | 11/2021 | Abotabl | |
| 2021/0377108 | A1* | 12/2021 | Cho | H04L 41/0896 |
| 2022/0182160 | A1* | 6/2022 | Su | H04B 1/525 |
| 2022/0360362 | A1* | 11/2022 | Ioffe | H04W 52/365 |
| 2023/0010875 | A1* | 1/2023 | Zhang | H04L 5/0023 |

OTHER PUBLICATIONS

"International Search Report" mailed on Dec. 15, 2022 for International application No. PCT/CN2022/126935, International filing date: Oct. 24, 2022.

* cited by examiner

COMMUNICATION APPARATUS AND METHOD FOR CONFIGURING A TRANSMITTER BANDWIDTH AND A RECEIVER BANDWIDTH

CROSS REFERENCE TO RELATED APPLICATION

This application claims the benefit of U.S. Provisional Application No. 63/279,206, filed on Nov. 15, 2021. Further, this application claims the benefit of U.S. Provisional Application No. 63/336,386, filed on Apr. 29, 2022. The contents of these applications are incorporated herein by reference.

FIELD OF THE INVENTION

The present invention relates to a communication apparatus and a method used in a wireless communication system, and more particularly, to a communication apparatus and a method for configuring a transmitter (Tx) bandwidth (BW) and a receiver (Rx) BW.

BACKGROUND OF THE INVENTION

A high power user equipment (HPUE) is a special class of UE for the long-term evolution (LTE) network and the fifth generation (5G) new radio (NR) network. In the 3rd Generation Partnership Project (3GPP) Rel-11 standard and the 3GPP Rel-14 standard, the HPUE for a band 14 and a band 41 for a time division duplex (TDD) is proposed. In the 3GPP Rel-17 standard, the HPUE for NR bands (e.g., n1 and n3 bands) for a frequency division duplex (FDD) is proposed.

As the market demands increase, the operators intend to enhance an uplink (UL) throughput of the HPUE by using a wide channel bandwidth (CBW). For example, the n3, n5 and n28 bands for the FDD. However, the HPUE suffers from a receiver (Rx) desensitization because of a small gap between a transmitter (Tx) bandwidth (BW) and an Rx BW.

SUMMARY OF THE INVENTION

It is an objective of the invention to provide a communication apparatus, in order to solve the above problem.

An embodiment of the invention provides a method for configuring a transmitter (Tx) bandwidth (BW) and a receiver (Rx) BW of a communication apparatus, comprising: transmitting a first capability of a Tx and a second capability of an Rx to a network device; receiving at least one configuration associated to the first capability and the second capability from the network device; and configuring the Tx BW and the Rx BW according to the at least one configuration; wherein the Tx BW is in a Tx channel BW (CBW), and the Rx BW is in an Rx CBW.

An embodiment of the invention provides a communication apparatus comprising a radio transceiver and a processing circuit. The radio transceiver is configured to transmit or receive wireless signals. The processing circuit is coupled to the radio transceiver and configured to perform operations comprising: transmitting a first capability of a Tx and a second capability of an Rx to a network device; receiving at least one configuration associated to the first capability and the second capability from the network device; and configuring a Tx BW and an Rx BW of the communication apparatus according to the at least one configuration; wherein the Tx BW is in a Tx channel BW, and the Rx BW is in an Rx CBW.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms “include” and “comprise” are used in an open-ended fashion, and thus should be interpreted to mean “include, but not limited to . . . ”. Also, the term “couple” is intended to mean either an indirect or direct electrical connection. Accordingly, if one device is coupled to another device, that connection may be through a direct electrical connection, or through an indirect electrical connection via other devices and connections.

Figure 1:
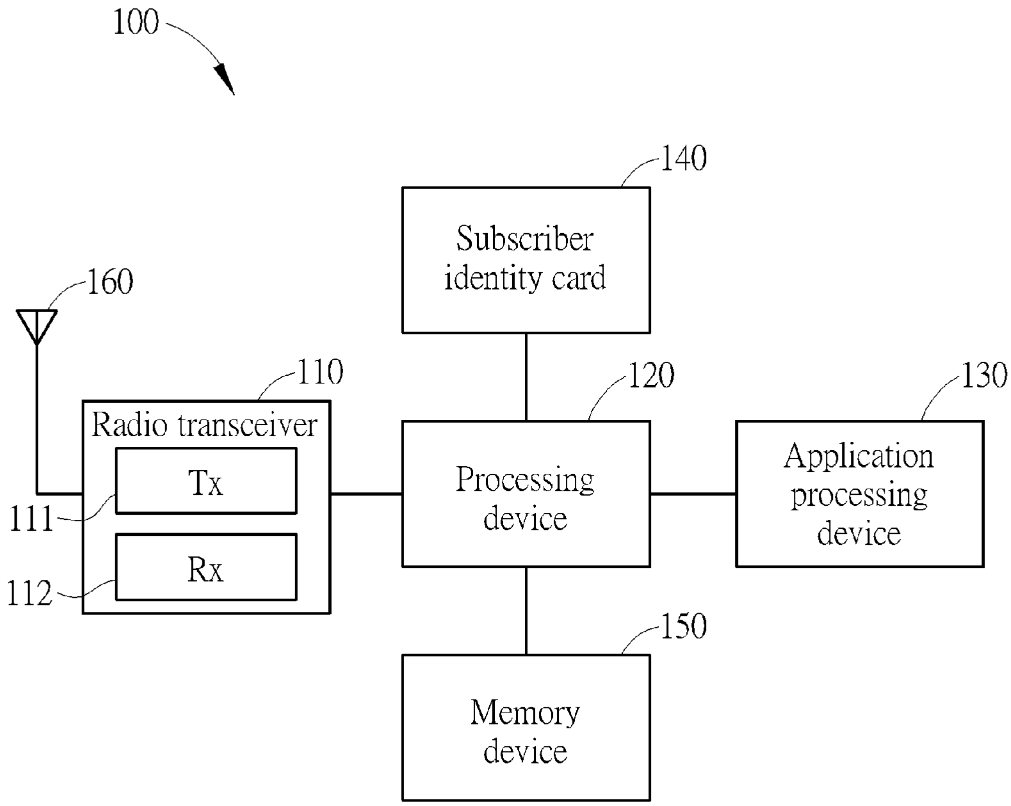
FIG. 1 is an exemplary block diagram of a communication apparatus according to an embodiment of the invention.

FIG. 1 is an exemplary block diagram of a communication apparatus 100 according to an embodiment of the invention. The communication apparatus 100 may be a portable electronic device, such as a Mobile Station (MS), which may be interchangeably referred to as User Equipment (UE). The communication apparatus 100 may comprise a radio transceiver 110, a processing device 120, an application processing device 130, a subscriber identity card 140, a memory device 150 and at least one antenna 160. The radio transceiver 110 may be configured to transmit and/or receive wireless signals to and/or from a network device (not shown) via the antenna(s) 160, so as to communicate with the network device via a communication link established between the communication apparatus 100 and the network device. The radio transceiver 110 may comprise a receiver (Rx) 112 configured to receive wireless signals and a transmitter (Tx) 111 configured to transmit wireless signals. The radio transceiver 110 may be further configured to perform radio frequency (RF) signal processing. For example, the Rx 112 may convert the received signals into intermediate frequency (IF) or baseband signals to be processed, or the Tx 111 may receive the IF or baseband signals from the processing device 120 and convert the received signals into wireless signals to be transmitted to the network device in the wireless network or in an access network (e.g., a terrestrial network (TN), a non-terrestrial network (NTN), a wireless local area network (WLAN), a personal area network (PAN) or a wireless local access network). According to an embodiment of the invention, the network device may be a cell, a Node-B (NB), an evolved Node-B (eNB), a g Node-B (gNB), a base station, a Mobility Management Entity (MME), an Access and Mobility Management Function (AMF) device, etc., at the network side and communicating with the communication apparatus 100 by the wireless signals via the communication link.

The Tx 111 and the Rx 112 of the radio transceiver 110 may comprise a plurality of hardware devices to perform RF conversion and RF signal processing. For example, the Tx 111 and/or the Rx 112 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a long-term evolution (LTE) system, the frequency of any specific frequency band for a 5G next generation (NR) system, the frequency of any specific frequency band for a WiFi system, or the frequency of any specific frequency band for a Bluetooth (BT) system, etc.

The processing device 120 may be configured to handle corresponding communication protocol operations and processing the signals received from or to be transmitted to the radio transceiver 110. The application processing device 130 is configured to run the operating system of the communication apparatus 100 and to run application programs installed in the communication apparatus 100. The processing device 120 and the application processing device 130 can be realized by means of hardware (circuitry), software, firmware (known as a combination of a hardware device and computer instructions and data that reside as read-only software on the hardware device), an electronic system, or combination thereof. In the embodiments of the invention, the processing device 120 and the application processing device 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a subscriber identity module (SIM), universal mobile telecommunication system (UMTS) SIM (USIM), removable user identity module (R-UIM) or code division multiple access (CDMA) SIM (CSIM) card, or the like and may typically contain user account information, an International Mobile Subscriber Identity (IMSI) and a set of SIM application toolkit (SAT) commands and may provide storage space for phone book contacts. The memory device 150 may be coupled to the processing device 120 and the application processing device 130 and may store system data or user data.

It should be noted that, in order to clarify the concept of the invention, FIG. 1 presents a simplified block diagram in which only the elements relevant to the invention are shown. For example, in some embodiments of the invention, the communication apparatus 100 may further comprise some peripheral devices not shown in FIG. 1. In another example, in some embodiments of the invention, the communication apparatus 100 may further comprise a central controller coupled to the processing device 120 and the application processing device 130. Therefore, the invention should not be limited to what is shown in FIG. 1.

In some embodiments of the invention, the communication apparatus 100 is capable of supporting multiple radio access technologies (RATs) communications via the single-card structure as shown in FIG. 1. It should be noted that, although FIG. 1 shows a single-card application, the invention should not be limited herein. For example, in some embodiments of the invention, the communication apparatus 100 may comprise multiple subscriber identity cards to support the multi-RATs communications, in either a single-standby or a multiple-standby manner. In the multi-RATs communication applications, the modem, the radio transceiver and/or the antenna module may be shared by the subscriber identity card(s) and may have the capability of handling the operations of different RATs and processing the corresponding RF, IF or baseband signals in compliance with the corresponding communication protocols.

In addition, those who are skilled in this technology can still make various alterations and modifications based on the descriptions given above to derive the communication apparatuses comprising multiple radio transceivers and/or multiple antenna modules for supporting multi-RAT wireless communications without departing from the scope and spirit of this invention. Therefore, in some embodiments of the invention, the communication apparatus 100 may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be virtual cards, such as individual identifiers, numbers, addresses, or the like which are burned in the internal memory device of the corresponding modem and are capable of identifying the communication apparatus 100. Therefore, the invention should not be limited to what is shown in FIG. 1.

It should be further noted that in some embodiments of the invention, the communication apparatus 100 may further support multiple IMSIs.

Figure 2:
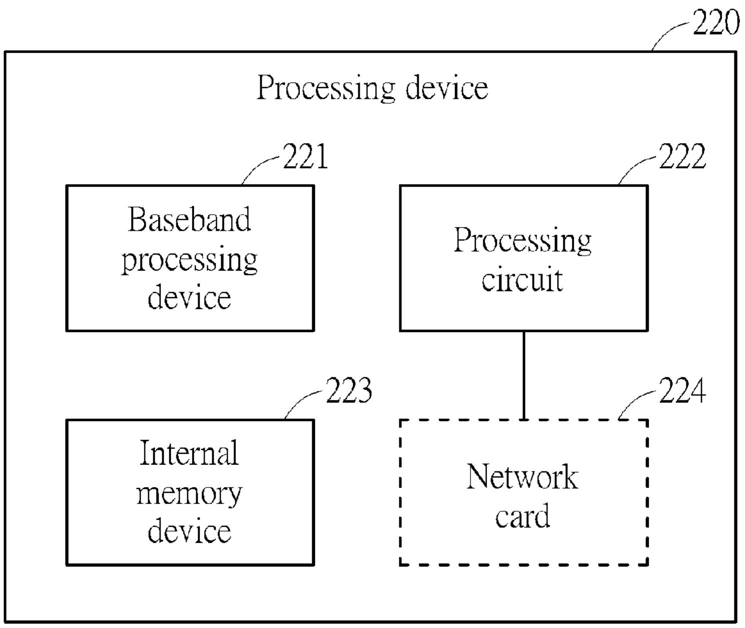
FIG. 2 is an exemplary block diagram of a modem according to an embodiment of the invention.

FIG. 2 is an exemplary block diagram of a processing device 220 according to an embodiment of the invention. The processing device 220 may be the processing device 120 shown in FIG. 1 and may comprise at least a baseband processing device 221, a processing circuit 222, an internal memory device 223 and a network card 224. The baseband processing device 221, the processing circuit 222, the internal memory device 223 and the network card 224 can be realized by means of hardware (circuitry), software, firmware, an electronic system, or combination thereof. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware circuits to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The processing circuit 222 may control the operations of the processing device 220. According to an embodiment of the invention, the processing circuit 222 may be a processor arranged to execute the program codes of the processing device 220. For example, the processing circuit 222 may maintain and execute the individual tasks, threads, and/or protocol stacks for different software modules. A protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

In some embodiments of the invention, the processing circuit 222 may be pure hardware dedicated to dealing with the proposed method for handling interference on a non-terrestrial network. This alternative design also falls within the scope of the present invention.

The processing circuit 222 may also read data from the subscriber identity card coupled to the processing device (e.g., the subscriber identity card 140 in FIG. 1), and write data to the subscriber identity card. The internal memory device 223 may store system data and user data for the processing device 220. The processing circuit 222 may also access the internal memory device 223.

The network card 224 provides Internet access services for the communication apparatus 100. It should be noted that, although the network card 224 shown in FIG. 2 is configured inside of the processing device 220, the invention should not be limited thereto. In some embodiments of the invention, the communication apparatus 100 may also comprise a network card configured outside of the processing device, or the communication apparatus 100 may also be coupled to an external network card for providing Internet access services. In some embodiments of the invention, the network card 224 may be a virtual network card, instead of a tangible card, that is created by the operating system of the communication apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the processing device 220 may also comprise more than one processing circuit and/or more than one baseband processing device. For example, the processing device 220 may comprise multiple processing circuits and/or multiple baseband processing devices for supporting multi-RAT operations. Therefore, the invention should not be limited to what is shown in FIG. 2.

It should be further noted that in some embodiments of the invention, the baseband processing device 221 and the processing circuit 222 may be integrated into one processing unit, and the processing device may comprise one or multiple such processing units, for supporting multi-RAT operations. Therefore, the invention should not be limited to what is shown in FIG. 2.

According to an embodiment of the invention, the processing circuit 222 and the application processing device 130 may comprise a plurality of logics designed for handling one or more functionalities. The logics may be configured to execute the program codes of one or more software and/or firmware modules, thereby performing the corresponding operations. When performing the corresponding operations by executing the corresponding programs, the logics may be regarded as dedicated hardware devices or circuits, such as dedicated processor sub-units. Generally, the processing circuit 222 may be configured to perform operations of relative lower protocol layers while the application processing device 130 may be configured to perform operations of relative higher protocol layers. Therefore, in some embodiments of the invention, the application processing device 130 may be regarded as the upper layer entity or upper layer processing circuit with respect to the processing circuit 222 and the processing circuit 222 may be regarded as the lower layer entity or lower layer processing circuit with respect to the application processing device 130.

Figure 3:
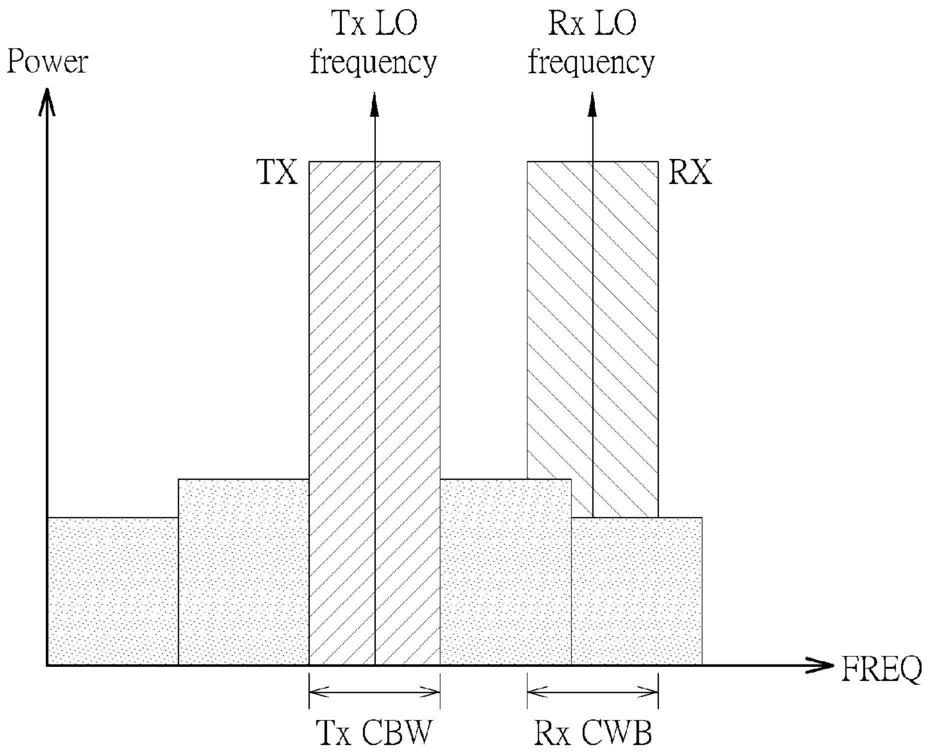
FIG. 3 is a schematic diagram of configuring a Tx BW and an Rx BW according to an example of the present invention.

FIG. 3 is a schematic diagram of configuring a Tx BW and an Rx BW according to an example of the present invention. The x-axis is a frequency (FREQ) domain, and the unit is megahertz (MHz). The y-axis is a power domain, and the unit is dBm/MHz. There is a traditional transceiver method of the communication apparatus 100 in FIG. 3. The Tx 111 transmits data with a Tx CBW, and the Rx 112 receives data with an Rx CBW. Center frequencies of the Tx CBW and the Rx CBW are a Tx local oscillator (LO) frequency and an Rx LO frequency, respectively. A plurality of interferences (e.g., adjacent channel leakage ratio (ACLR)) (e.g., shown as a dotted pattern) are generated after a transmission resource of the Tx 111 (e.g., shown as left slashes) and the Tx LO frequency are mixed. Part of the interferences overlaps the reception resources (e.g., shown as right slashes). That is, the Rx 112 suffers from the interferences, when the Tx 111 and the Rx 112 transceiver data simultaneously.

Figure 4:
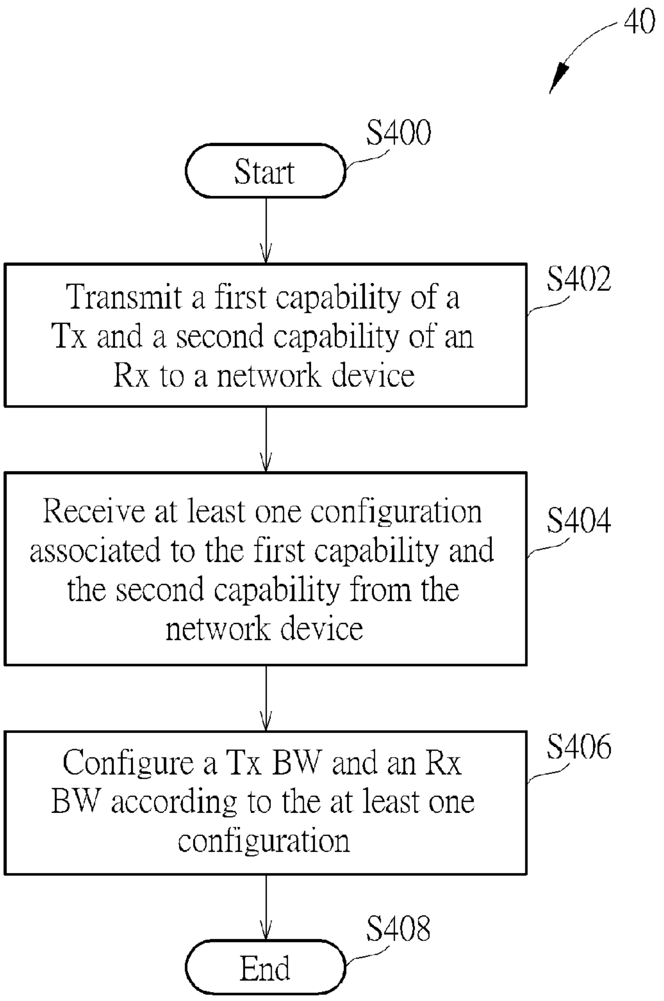
FIG. 4 is a flowchart of a process according to an embodiment of the invention.

FIG. 4 is a flowchart of a process 40 utilized in a communication apparatus (e.g., the communication apparatus 100 shown in FIG. 1) according to an embodiment of the invention, to configure a Tx BW of a Tx (e.g., the Tx 111 shown in FIG. 1) and an Rx BW of an Rx (e.g., the Rx 112 shown in FIG. 1). Provided that the result is substantially the same, the steps are not required to be executed in the exact order shown in FIG. 4. The process 40 comprises the following steps:

Step S400: Start.

Step S402: Transmit a first capability of a Tx and a second capability of an Rx to a network device.

Step S404: Receive at least one configuration associated to the first capability and the second capability from the network device.

Step S406: Configure a Tx BW and an Rx BW according to the at least one configuration Step S408: End.

The processing circuit 222 is configured to perform steps of the process 40. According to the process 40, the communication apparatus 100 configures (e.g., sets) the Tx BW and the Rx BW according to the at least one configuration received from the network device. In an embodiment of the invention, the at least one configuration is used for configuring (e.g., restricting) the Tx BW (or a Tx channel BW (CBW)) and a number of resource blocks (RBs) to be transmitted, to approach a 0 decibel (dB) Rx desensitization. In an embodiment of the invention, the at least one configuration is used for configuring the Tx BW and the Rx BW with at least one of a variant full duplex (FD) operation and a variant half duplex (HD) operation. Thus, the Tx BW and the Rx BW are configured dynamically, and the Rx desensitization may be improved. In an embodiment of the invention, the Tx BW is in the Tx CBW, and the Rx BW is in an Rx CBW.

There are various ways to configure the Tx BW and the Rx BW according to the at least one configuration. In an embodiment of the invention, the communication apparatus 100 decreases (e.g., narrows) the Tx BW, and configures that the Rx BW is equal to the Rx CBW. The Tx BW is smaller than the Tx CBW. For example, the Tx BW is not greater than one half of the Tx CBW. For example, the Tx BW is not greater than one quarter of the Tx CBW. In an embodiment of the invention, the communication apparatus 100 configures that the Tx BW is equal to the Tx CBW in a plurality of first time durations, and configures that the Tx BW is 0 in a plurality of second time durations. The communication apparatus 100 configures that the Rx BW is 0 in the plurality of first time durations, and configures that the Rx BW is equal to the Rx CBW in the plurality of second time durations. In an embodiment of the invention, the communication apparatus 100 configures that the Tx BW is equal to the Tx CBW in the plurality of first time durations, and decreases the Tx BW in the plurality of second time durations. The communication apparatus 100 configures that the Rx BW is 0 in the plurality of first time durations, and configures that the Rx BW is equal to the Rx CBW in the plurality of second time durations. In an embodiment of the invention, the communication apparatus 100 decreases the Rx BW in response to the Tx BW being increased, and increases (e.g., widens) the Rx BW in response to the Tx BW being decreased. A gap between the Tx BW and the Rx BW is greater than a threshold, and the threshold is a positive number. In an embodiment of the invention, the communication apparatus 100 configures that the Rx BW is 0 in response to the Tx BW being equal to the Tx CBW. In an embodiment of the invention, the communication apparatus 100 configures that the Tx BW is 0 in at least one specific time duration. In an embodiment of the invention, the communication apparatus 100 configures that the Tx BW is equal to the Tx CBW in the plurality of first time durations, and decreases the Tx BW in the plurality of second time durations. The communication apparatus 100 divides the Rx BW into a plurality of sub-BWs in the plurality of first time durations, and configures that the Rx BW is equal to the Rx CBW in the plurality of second time durations. The Rx 112 receives the same data in the plurality of sub-BWs (e.g., Rx maximum ratio combining (MRC)).

In an embodiment of the invention, the plurality of first time durations and the plurality of second time durations are staggered, and do not overlap with each other. In an embodiment of the invention, a first center frequency of the Tx CBW is a Tx LO frequency. In an embodiment of the invention, a second center frequency of the Rx CBW is an Rx LO frequency. In an embodiment of the invention, the communication apparatus is a high power user equipment (HPUE) (e.g., a Power Class 2 (PC2) UE).

Figure 5:
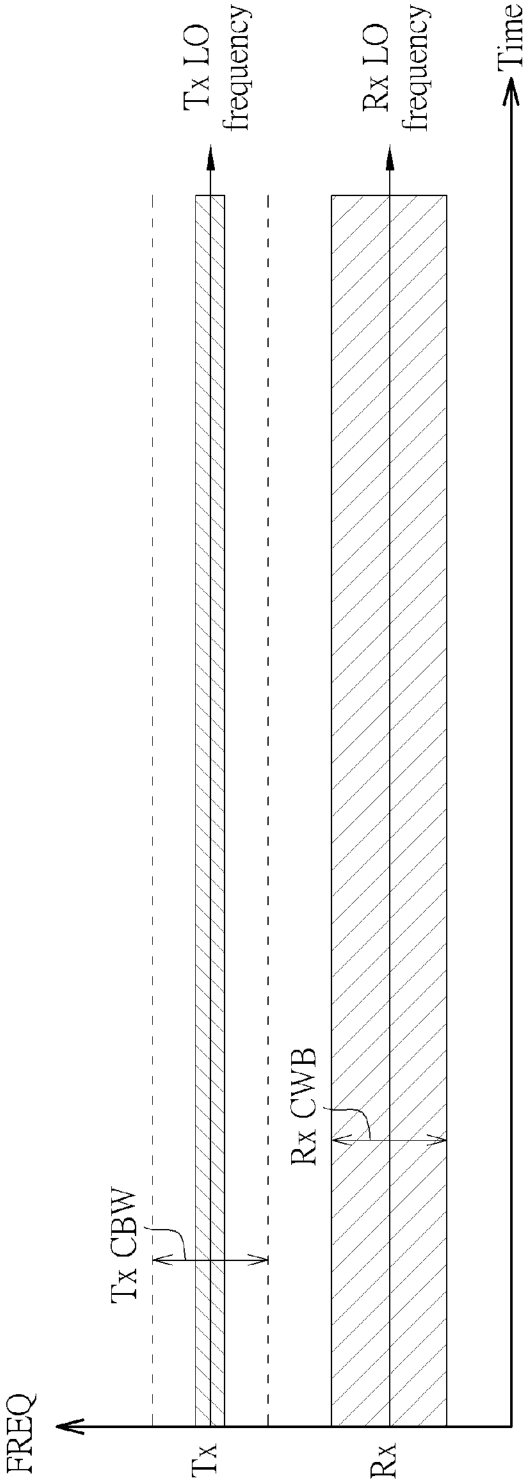
FIG. 5 is a schematic diagram of configuring a Tx BW and an Rx BW with an FD operation according to an example of the present invention.

FIG. 5 is a schematic diagram of configuring a Tx BW and an Rx BW with an FD operation according to an example of the present invention. The x-axis is a time domain, and the unit is microsecond (μs). The y-axis is a FREQ domain, and the unit is MHz. The Tx CBW is the maximum of the Tx BW, and the center frequency of the Tx CBW is Tx LO frequency. The Rx CBW is the maximum of the Rx BW, and the center frequency of the Rx CBW is Rx LO frequency. The transmission resource of Tx 111 is shown as left slashes, and the reception resource of the Rx 112 is shown as right slashes. In FIG. 5, the communication apparatus 100 decreases (e.g., narrows) the Tx BW, and configures that the Rx BW is equal to the Rx CBW. That is, the Tx 111 transmits data with the decreased (e.g., narrowed) Tx BW, and the Rx 112 receives data with the Rx CBW.

Figure 6:
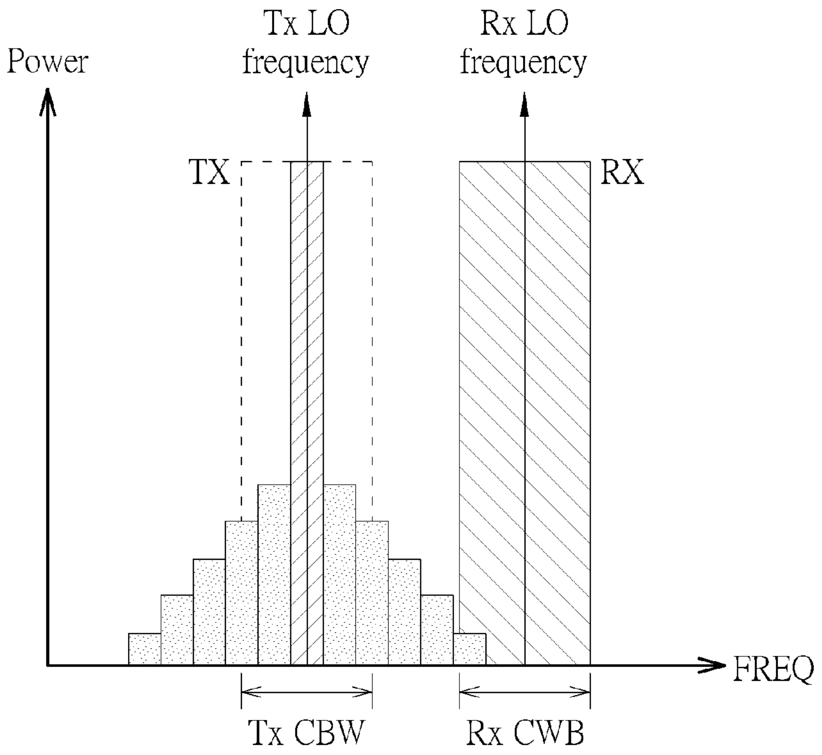
FIG. 6 is a schematic diagram of configuring a Tx BW and an Rx BW with an FD operation according to an example of the present invention.

FIG. 6 is a schematic diagram of configuring a Tx BW and an Rx BW with an FD operation according to an example of the present invention. The x-axis, the y-axis, the Tx LO frequency and the Rx LO frequency can be referred to FIG. 3, and are not narrated herein for brevity. FIG. 6 may be applied to FIG. 5. The Tx 111 transmits data with the decreased (e.g., narrowed) Tx BW, and the Rx 112 receives data with the Rx CBW. A plurality of interferences (e.g., ACLR) (e.g., shown as a dotted pattern) are generated after a transmission resource of the Tx 111 (e.g., shown as left slashes) and the Tx LO frequency are mixed. Part of the interferences overlaps a reception resource of the Rx 112 (e.g., shown as right slashes). Compared with FIG. 3, the region where the part of the interferences overlaps the Rx (i.e., the Rx desensitization) in FIG. 6 is smaller than that in FIG. 3, because the gap between the decreased Tx BW and the Rx BW (or the Rx CBW) becomes wider. The present invention provides a transceiver method to reduce the Rx desensitization.

Figure 7:
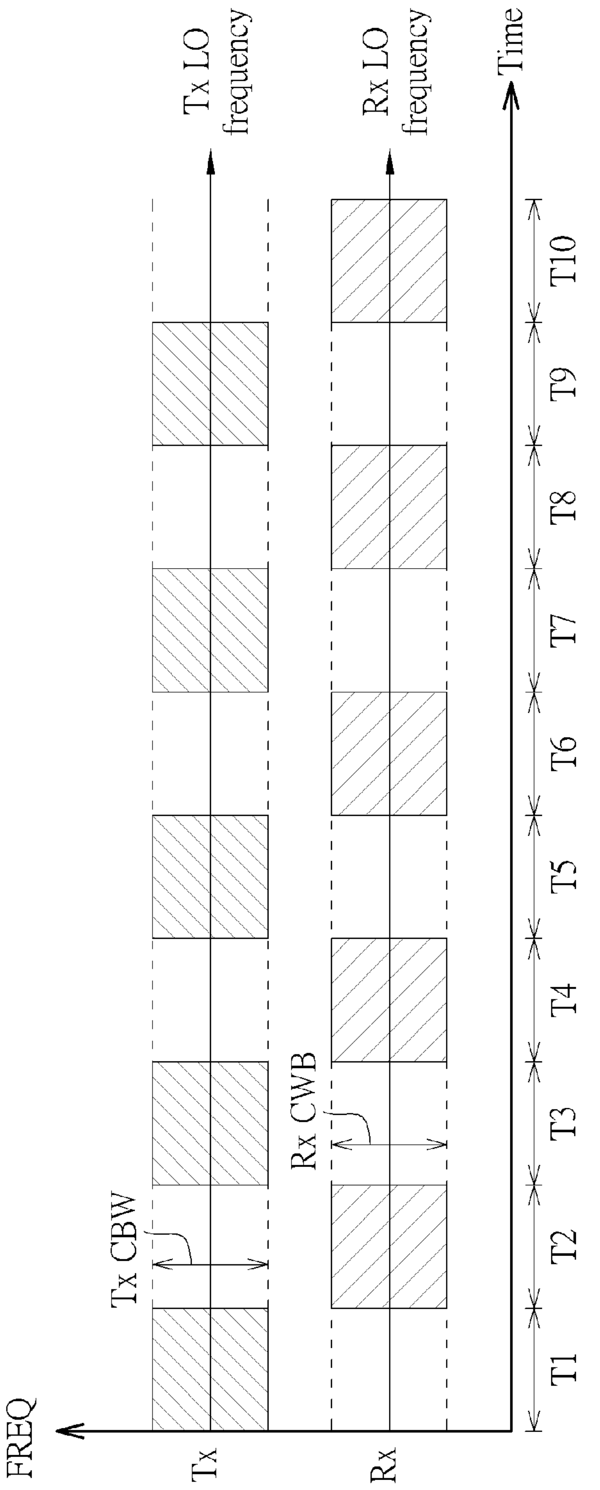
FIG. 7 is a schematic diagram of configuring a Tx BW and an Rx BW with an HD operation according to an example of the present invention.

FIG. 7 is a schematic diagram of configuring a Tx BW and an Rx BW with an HD operation according to an example of the present invention. The x-axis, the y-axis, the Tx CBW, the Rx CBW, the Tx LO frequency, the Rx LO frequency, the transmission resource and the reception resource can be referred to FIG. 5, and are not narrated herein for brevity. There are time durations T1-T10 in FIG. 7. The Tx 111 transmits data with the Tx CBW (e.g., configures that the Tx BW is equal to the Tx CBW) in the time durations T1, T3, T5, T7 and T9, and does not transmit data (e.g., configures that the Tx BW is 0) in the time durations T2, T4, T6, T8 and T10. The Rx 112 does not receive data (e.g., configures that the Rx BW is 0) in the time durations T1, T3, T5, T7 and T9, and receives data with 20) the Rx CBW (e.g., configures that the Rx BW is equal to the Rx CBW) in the time durations T2, T4, T6, T8 and T10. That is, the Rx 112 is off when the Tx 111 transmits data, and the Tx 111 is off when the Rx 112 receives data. The Tx 111 and the Rx 112 take turns transmitting and receiving data, and the Rx desensitization is avoided. It should be noted that the time durations T1, T3, T5, T7 and T9 may be the plurality of first time durations in the previous embodiments, and the time durations T2, T4, T6, T8 and T10 may be the plurality of second time durations in the previous embodiments.

Figure 8:
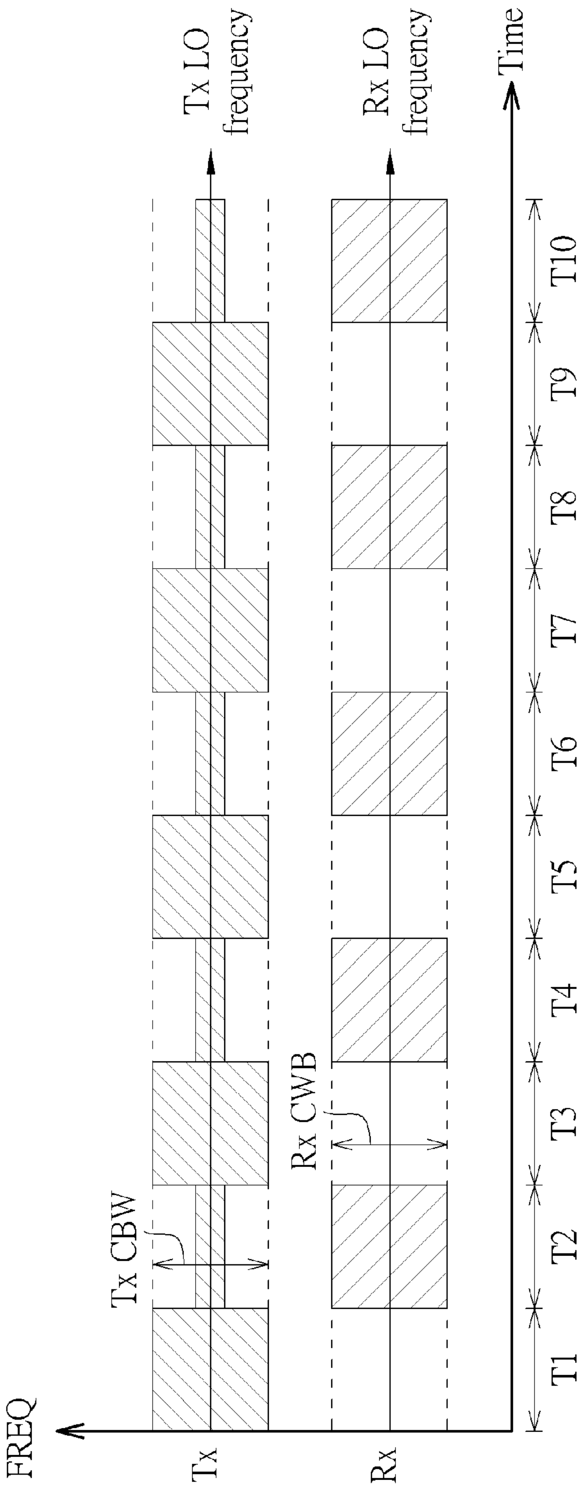
FIG. 8 is a schematic diagram of configuring a Tx BW and an Rx BW with a variant FD and HD operation according to an example of the present invention.

FIG. 8 is a schematic diagram of configuring a Tx BW and an Rx BW with a variant FD and HD operation according to an example of the present invention. The x-axis, the y-axis, the Tx CBW, the Rx CBW, the Tx LO frequency, the Rx LO frequency, the transmission resource, the reception resource and the time durations T1-T10 can be referred to FIG. 7, and are not narrated herein for brevity. The Tx 111 transmits data with the Tx CBW in the time durations T1, T3, T5, T7 and T9, and transmits data with the decreased Tx BW (e.g., decreases the Tx BW) in the time durations T2, T4, T6, T8 and T10. The Rx 112 does not receive data in the time durations T1, T3, T5, T7 and T9, and receives data with the Rx CBW in the time durations T2, T4, T6, T8 and T10. That is, the Rx 112 is off when the Tx 111 transmits data with the Tx CBW, while the Tx 11*l* is on with the decreased Tx BW when the Rx 112 receives data with the Rx CBW.

Figure 9:
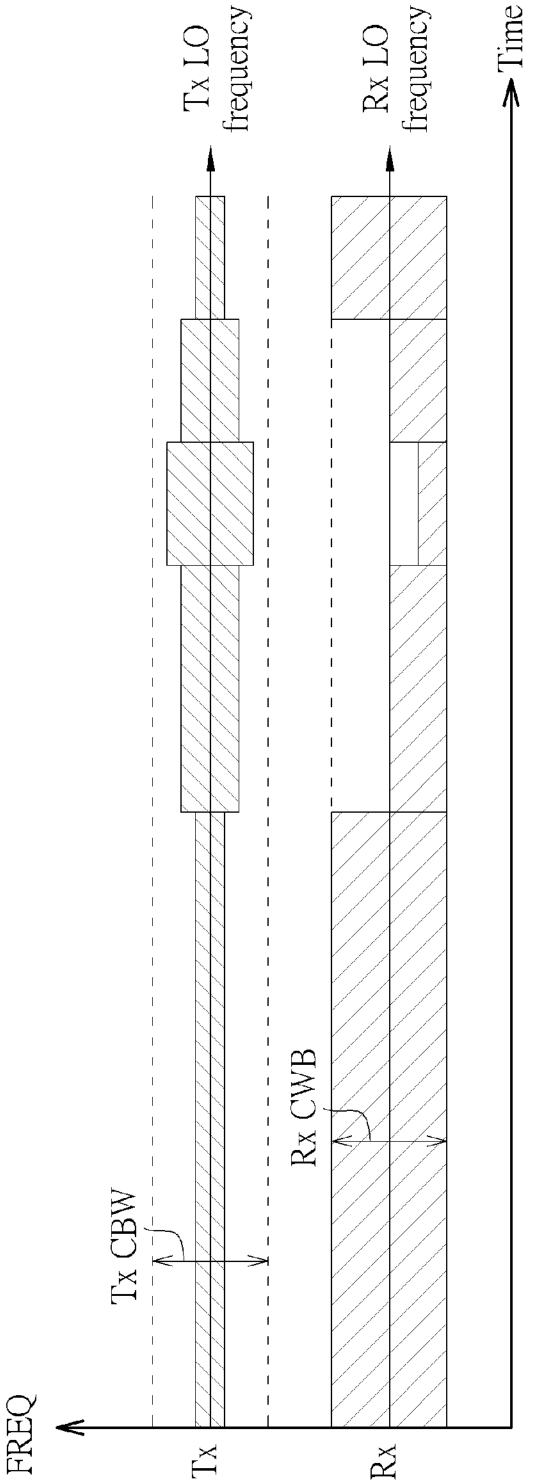
FIG. 9 is a schematic diagram of configuring a Tx BW and an Rx BW with a variant FD operation according to an example of the present invention.

FIG. 9 is a schematic diagram of configuring a Tx BW and an Rx BW with a variant FD operation according to an example of the present invention. The x-axis, the y-axis, the Tx CBW, the Rx CBW, the Tx LO frequency, the Rx LO frequency, the transmission resource and the reception resource can be referred to FIG. 5, and are not narrated herein for brevity. The Rx 112 decreases the Rx BW when the Tx 111 increases the Tx BW, and increases the Rx BW when the Tx 111 decreases the Tx BW, to ensure that the gap between the Tx BW and the Rx BW is greater than the threshold. That is, the Tx BW and the Rx BW are configured dynamically, and the Rx desensitization is improved.

Figure 10:
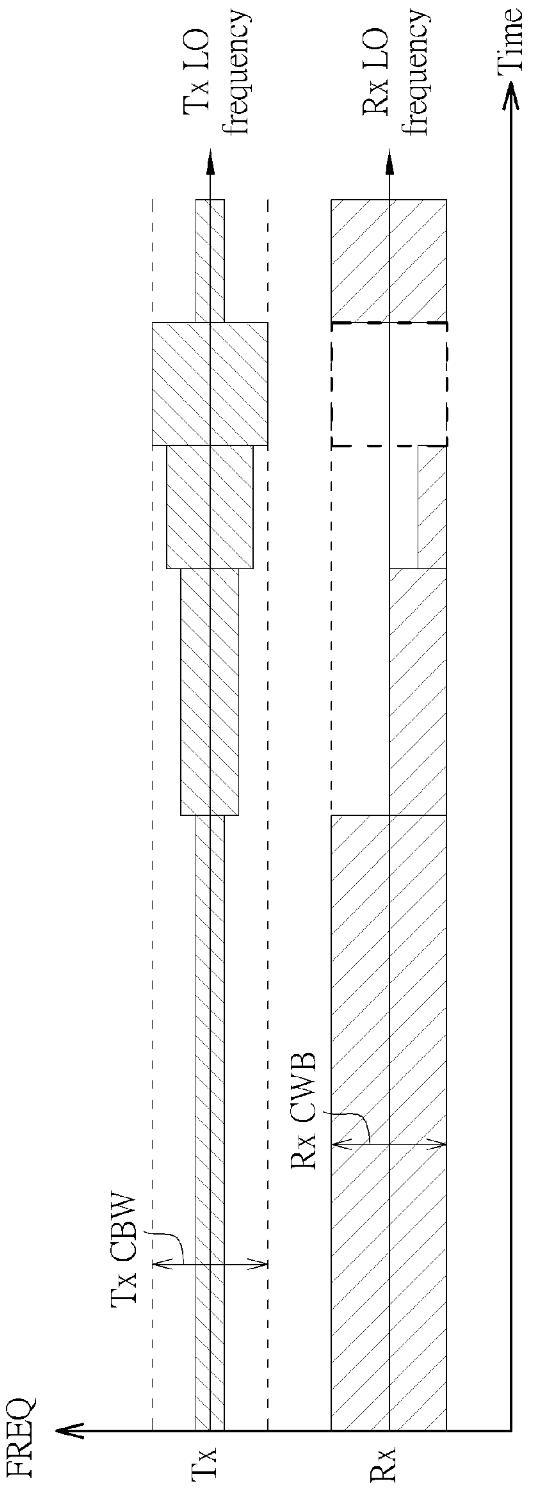
FIG. 10 is a schematic diagram of configuring a Tx BW and an Rx BW with a variant FD and HD operation according to an example of the present invention.

FIG. 10 is a schematic diagram of configuring a Tx BW and an Rx BW with a variant FD and HD operation according to an example of the present invention. The x-axis, the y-axis, the Tx CBW, the Rx CBW, the Tx LO frequency, the Rx LO frequency, the transmission resource and the reception resource can be referred to FIG. 5, and are not narrated herein for brevity. The Rx 112 decreases the Rx BW when the Tx 111 increases the Tx BW, and increases the Rx BW when the Tx 111 decreases the Tx BW, to ensure that the gap between the Tx BW and the Rx BW is greater than the threshold. The Rx 112 does not receive data (e.g., shown as a dashed box), when the Tx 111 transmits data with the Tx CBW. That is, the Rx 112 is off, when the Tx 111 transmits data with the maximum Tx BW.

Figure 11:
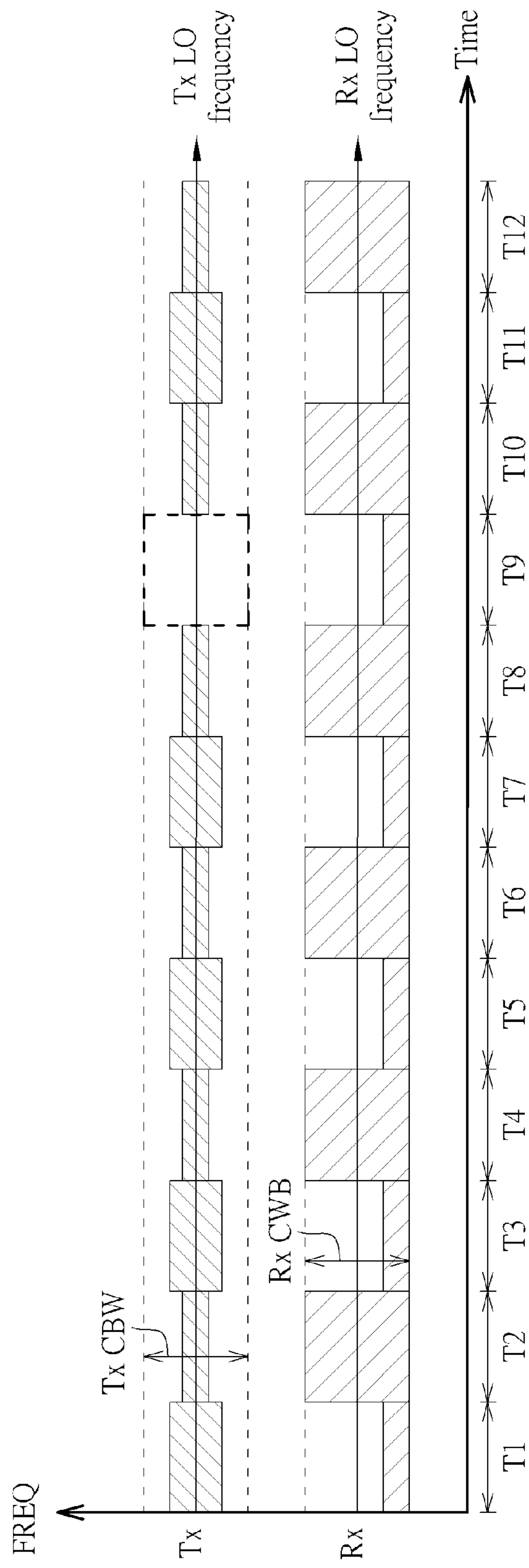
FIG. 11 is a schematic diagram of configuring a Tx BW and an Rx BW according to an example of the present invention.

FIG. 11 is a schematic diagram of configuring a Tx BW and an Rx BW according to an example of the present invention. The x-axis, the y-axis, the Tx CBW, the Rx CBW, the Tx LO frequency, the Rx LO frequency, the transmission resource and the reception resource can be referred to FIG. 5, and are not narrated herein for brevity. There are time durations T1-T12 in FIG. 11. The Rx 112 decreases the Rx BW when the Tx 111 increases the Tx BW (e.g., in the time durations T1, T3, T5, T7 and T11), and increases the Rx BW when the Tx 111 decreases the Tx BW (e.g., in the time durations T2, T4, T6, T8, T10 and T12). It should be noted that the Tx 111 does not transmit data in the specific time duration(s) (e.g., the time duration T9), shown as a dashed box. That is, the Tx is off in the specific time duration(s), to mitigate a specific absorption ratio (SAR).

Figure 12:
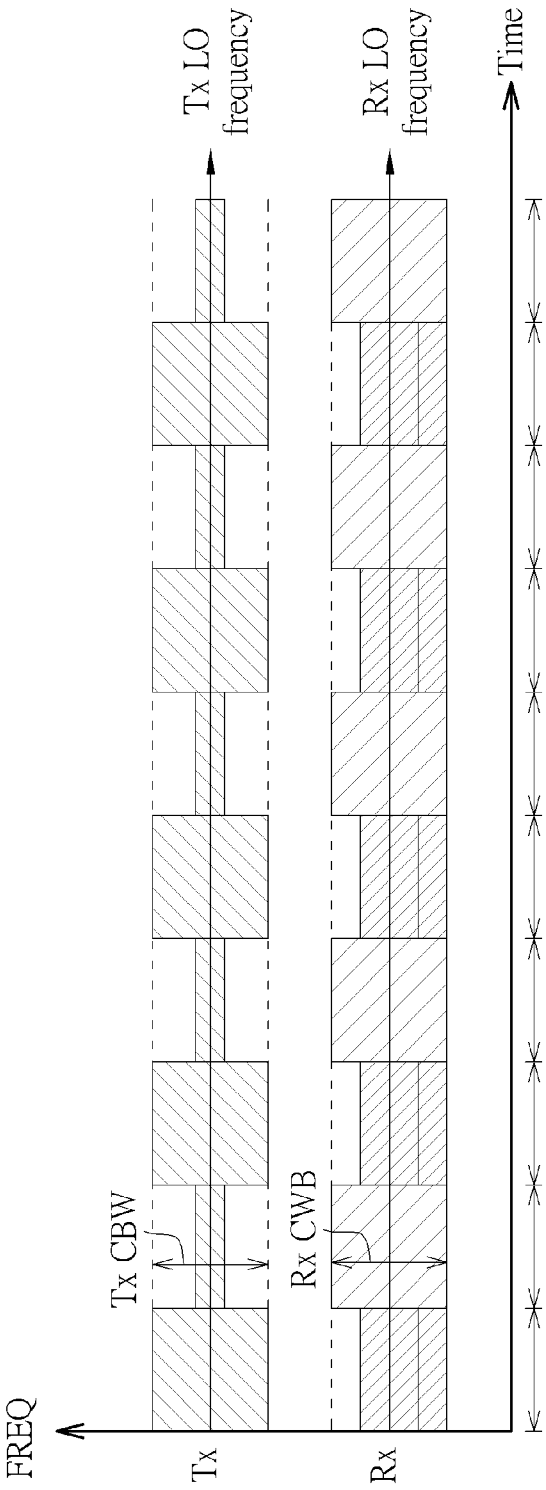
FIG. 12 is a schematic diagram of configuring a Tx BW and an Rx BW according to an example of the present invention.

FIG. 12 is a schematic diagram of configuring a Tx BW and an Rx BW according to an example of the present invention. The x-axis, the y-axis, the Tx CBW, the Rx CBW, the Tx LO frequency, the Rx LO frequency, the transmission resource, the reception resource and the time durations T1-T10 can be referred to FIG. 7, and are not narrated herein for brevity. The Tx transmits data with the Tx CBW in the time durations T1, T3, T5, T7 and T9, and transmits data with the decreased Tx BW in time durations T2, T4, T6, T8 and T10. The Rx 112 divides the Rx BW into a plurality of sub-BWs (e.g., 3 sub-BWs shown as denser right slashes) in the time durations T1, T3, T5, T7 and T9, and transmits the same data (e.g., the same 20 RBs) in the plurality of sub-BWs. The Rx 112 receives data with the Rx CBW in time durations T2, T4, T6, T8 and T10. That is, the communication apparatus 100 combines the same data of each sub-BW via the Rx MRC, to mitigate the signal- to noise ratio (SNR) under the self-TX interference.

To sum up, the present invention provides a communication apparatus and a method for configuring a Tx BW and an Rx BW. The communication apparatus configures the Tx BW and the Rx BW according to the at least one configuration received from the network device. Therefore, the Tx BW and the Rx BW are configured dynamically, and the Rx desensitization may be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for configuring a transmitter (Tx) bandwidth (BW) and a receiver (Rx) BW of a communication apparatus, comprising:
- transmitting a first capability of a Tx and a second capability of an Rx to a network device;
- receiving at least one configuration associated to the first capability and the second capability from the network device; and
- configuring the Tx BW and the Rx BW according to the at least one configuration;
- wherein the Tx BW is in a Tx channel BW (CBW), and the Rx BW is in an Rx CBW;
- wherein the step of configuring the Tx BW and the Rx BW according to the at least one configuration comprises:
  - configuring that the Tx BW is equal to the Tx CBW in a plurality of first time durations, and decreasing the Tx BW in a plurality of second time durations; and
  - dividing the Rx BW into a plurality of sub-BWs in the plurality of first time durations, and configuring that the Rx BW is equal to the Rx CBW in the plurality of second time durations;
- wherein the plurality of first time durations and the plurality of second time durations are staggered, and do not overlap with each other;
- wherein the Rx receives the same data in the plurality of sub-BWs.

2. The method of claim 1, wherein a first center frequency of the Tx CBW is a Tx local oscillator (LO) frequency, and a second center frequency of the Rx CBW is an Rx LO frequency.

3. The method of claim 1, wherein the communication apparatus is a high power user equipment (HPUE).

4. A communication apparatus, comprising:
- a radio transceiver, configured to transmit or receive wireless signals; and
- a processing circuit, coupled to the radio transceiver and configured to perform operations comprising:
- transmitting a first capability of a Tx and a second capability of an Rx to a network device;
- receiving at least one configuration associated to the first capability and the second capability from the network device; and configuring a Tx BW and an Rx BW of the communication apparatus according to the at least one configuration;

wherein the Tx BW is in a Tx channel BW (CBW), and the Rx BW is in an Rx CBW;

wherein the step of configuring the Tx BW and the Rx BW according to the at least one configuration comprises:

configuring that the Tx BW is equal to the Tx CBW in a plurality of first time durations, and decreasing the Tx BW in a plurality of second time durations; and dividing the Rx BW into a plurality of sub-BWs in the plurality of first time durations, and configuring that the Rx BW is equal to the Rx CBW in the plurality of second time durations;

wherein the plurality of first time durations and the plurality of second time durations are staggered, and do not overlap with each other;

wherein the Rx receives the same data in the plurality of sub-BWs.

5. The communication apparatus of claim 4, wherein a first center frequency of the Tx CBW is a Tx local oscillator (LO) frequency, and a second center frequency of the Rx CBW is an Rx LO frequency.

6. The communication apparatus of claim 4, wherein the communication apparatus is a high power user equipment (HPUE).

* * * * *